United States Patent [19]

Karim et al.

[11] 4,337,297

[45] Jun. 29, 1982

[54] COEXTRUDABLE THERMOPLASTIC COMPOSITIONS AND BONDS AND LAMINATES THEREFROM

[75] Inventors: Khalid A. Karim; James H. Rea, both of Houston, Tex.

[73] Assignee: Gulf Oil Corporation, Pittsburgh, Pa.

[21] Appl. No.: 284,149

[22] Filed: Jul. 16, 1981

[51] Int. Cl.$^3$ .................... C08F 18/10; C09J 5/06; B29D 9/00; B32B 27/30

[52] U.S. Cl. .................... 428/461; 156/327; 264/171; 264/DIG. 57; 428/463; 428/497; 428/483; 428/512; 428/514; 428/516; 525/125; 525/133; 525/308; 525/324; 524/271

[58] Field of Search ............ 525/308, 324, 125, 133; 260/27 R, 27 EV; 428/483, 497, 463, 461, 516, 514, 512; 264/171, DIG. 57; 156/327

[56] References Cited

U.S. PATENT DOCUMENTS

| | | | |
|---|---|---|---|
| 3,291,863 | 12/1966 | Frey et al. | 525/195 |
| 3,350,372 | 10/1967 | Anspon et al. | 526/329 |
| 3,463,753 | 8/1969 | Gonzenbach et al. | 260/27 |
| 3,929,928 | 12/1975 | Wolf et al. | 525/125 |
| 3,934,056 | 1/1976 | Yoshida et al. | 525/133 |

FOREIGN PATENT DOCUMENTS 635511 1/1964 Belgium .
1167460 10/1969 United Kingdom .

OTHER PUBLICATIONS

Kirk—Othmer—Encyclopedia of Chemical Technology 2nd Ed., vol. 17, pp. 475–508 (1968).

*Primary Examiner*—H. S. Cockeram
*Attorney, Agent, or Firm*—Richard L. Kelly

[57] ABSTRACT

Blends of thermoplastic polymers which may be coextruded to form bonding layers in film laminates contain (a) a copolymer of ethylene with a lower alkyl acrylate or methacrylate or vinyl acetate, (b) a chlorinated ethylene polymer and optionally (c) a tackifying resin.

18 Claims, No Drawings

COEXTRUDABLE THERMOPLASTIC COMPOSITIONS AND BONDS AND LAMINATES THEREFROM

BACKGROUND OF THE INVENTION

It is often desired to take advantage of desirable properties of two or more unlike polymers, or of a polymer and a metal foil in manufacturing sheets or films to be used for coextrusion of two molten polymer streams in contact with each other to form a two-layer film. Unfortunately, however, two unlike polymers with unique desirable properties often fail to adhere to each other when the coextruded film cools. So as to obtain a strong bond between two unlike materials, a third composition is extruded between the two films. This third composition must have the ability to adhere to both of the other films and withstand the stresses to which the laminated structure is subjected when put to use. It is often necessary to formulate the bonding composition so as to meet the adhesion requirements of each laminated structure, as strong adhesion to several different types of films is difficult to achieve in a single composition.

DESCRIPTION OF THE PRIOR ART

While the prior art has disclosed use of one of the polymers employed in the compositions of this invention as an adhesive layer and the use of tackifying resins in adhesives is known, the prior art does not disclose the combination of two polymers which is disclosed and claimed herein.

SUMMARY OF THE INVENTION

The applicant has discovered novel blends of polymers consisting essentially of:
(a) An ethylene copolymer,
(b) Chlorinated polyethylene, and
(c) Optionally a tackifying resin.

The compositions have utility principally as hot melt adhesives and as laminating resins used in the manufacture of composite film structures by coextrusion processes.

DETAILED DESCRIPTION OF THE INVENTION

The ethylene copolymers included in the compositions have polymerized therein about 70 to 90, preferably about 78–83, and more especially about 80 weight % of ethylene, with the balance of the copolymer being an alkyl ester of acrylic or methacrylic acid or vinyl acetate. The alkyl group of the acrylic or methacrylic acid ester may contain from about 1 to 18 carbon atoms, with the preferred esters being the methyl and the ethyl esters. The preferred ethylene copolymers will have melt indexes (as determined by ASTM 1238-70, Condition E) in the range of about 1–100, preferably about 2–40, and more especially about 15–25. (The vinyl acetate copolymers normally will have higher melt index values than the acrylate ester copolymers). Such copolymers can be prepared by known methods as disclosed, for example, in U.S. Pat. No. 3,350,372.

The chlorinated polyethylene resins included in the compositions have an average chlorine content of about 20–50 weight %, preferably about 25–40 weight %, and more especially, about 25–35 weight %. Such resins are commercially available. They can be prepared by chlorinating either low-density or high-density polyethylene resins by methods reported in U.S. Pat. No. 3,291,863, Netherlands Application 64/05,008, Belgium Pat. No. 635,511 and British Pat. No. 1,167,460, which descriptions are incorporated herein by reference.

The tackifying resins employed in the compositions of the invention will be selected from the group consisting of:
(a) Terpene resins having a Ring and Ball softening point of about 10°–150° C.,*
(b) Aliphatic hydrocarbon resins having a Ring and Ball softening point of about 10°–135° C.,*
(c) Rosin esters having a Ring and Ball softening point of about 65°–140° C.,*
(d) Alpha-methylstyrene/vinyl toluene copolymers having a Ring and Ball softening point of about 75°–120° C.,*
(e) Polystyrene resins having a Ring and Ball softening point of about 25°–100° C.,*
(f) Terpene-phenolic resins having a Ring and Ball softening point of about 80°–135° C.,*
(g) Rosin,
(h) Aromatic hydrocarbon resins having a Ring and Ball softening point of about 40°–160° C.,* and
(j) Terpene-urethane resins having a Ring and Ball softening point of about 80°–135° C.,*

*All Ring and Ball softening points determined by ASTM E-28-58T.

The tackifying resins employed in the invention are known products available from commercial sources. The rosin tackifiers suitable for use are those described in the Kirk-Othmer *Encyclopedia of Chemical Technology*, Interscience Publishers, Second Edition, Volume 17, pages 475–509. These include not only the natural occurring rosins, but the chemically modified rosins obtained by hydrogenation, dehydrogenation, isomerization, dimerization, and the like.

The terpene resins employed typically will have a Ring and Ball softening point of about 10°–150° C., and preferably about 70°–120° C. Such resins generally are prepared by the polymerization of terpene hydrocarbons in the presence of Friedel-Crafts catalysts at moderately low temperatures; examples of commercially available resins of this type being the Nirez resins sold by the Reichhold Chemical Corporation, and the Piccolyte S-10, S-25, S-70, S-85, S-100, S-115, S-125, and S-135 resins as sold by the Hercules Chemical Corporation.

The aliphatic hydrocarbon resins employed will have a Ring and Ball softening point of about 10°–135° C. These resins are prepared by polymerization of monomers consisting primarily of 5 carbon atom olefins and diolefins; examples of commercially available resins of this type being Wing-Tac 95 as sold by the Goodyear Tire and Rubber Company and the Sta-Tac resins sold by the Reichhold Chemical Corporation.

The rosin esters employed are formed by esterifying a rosin acid with a di-, tri-, or tetra-hydroxy aliphatic alcohol such as ethylene glycol, propylene glycol (either the 1,2 or the 1,3 isomer), glycerine, or pentaerythritol. The rosin acid employed will be any of the standard grades sold in commerce; the product sold under the trade designation ACINTOL R Type S being typical of acids satisfactory for use in the present invention. The typical rosin acids sold in commerce are obtained principally from tall oil and will have the following typical analysis:*

| | |
|---|---|
| Rosin Acids | 88–92% |
| Rosin Esters and Anhydrides | 4–6% |

-continued

| | |
|---|---|
| Unsaponifiable Matter | 2-6% |
| Fatty Acids | 1-3% |

*The presence of the minor components causes no difficulties in preparing the esters employed in the invention.

The rosin acids are mixtures of two principal types, the abietic types and the pimaric types. A typical distribution of individual acids found in commercial rosin acids is:

| Rosin Acid | Typical Analysis |
|---|---|
| Abietic Acid | 34% |
| Dehydroabietic Acid | 24% |
| Palustric Acid | 9% |
| Isopimaric Acid | 6% |
| Dihydroabietic Acid | 5% |
| Pimaric Acid | 5% |
| Neoabietic Acid | 3% |

Suitable rosin esters which are commercially available include the glyceryl ester sold under the designation Foral 85 and the pentaerythritol ester sold under the designation Foral 105.

The alpha-methylstyrene/vinyl toluene copolymers are known products, certain of which are sold under the Piccotex trade designation. Similarly, the low molecular weight polystyrene resins are known products, certain of which are sold under the trade designation Piccolastic. The terpene-phenolic resins are known materials described at pages 183 and 184 of the text *Organic Coating Technology*, Volumne I, by Henry Fleming Payne, John Wiley & Sons, Inc., 1954, Library of Congress Catalog Card Number 54-5971, which description is incorporated herein by reference. Resins of this type are sold under the trade designation Piccofyn.

The suitable aromatic hydrocarbon resins are derived from petroleum or coal tar distillates. Particularly suitable are those selected from the group consisting of resins based on coumarone or indene, such as coumarone-indene resins, styrene-indene-isoprene terpolymers, etc. In general, the Ring and Ball softening point of these resins will be between about 40° C. to about 160° C. Certain of these resins are sold under the trade designation Piccovar. The terpene-urethane resins are known compounds sold under the commercial designation Isoterp. They are discussed in U.S. Pat. No. 3,463,753, which descriptions are incorporated herein by reference.

For an expanded list of suitable tackifying resins, see CA Report No. 37, published in October, 1971, by the Technical Association of The Pulp and Paper Industry and titled "Raw Materials for Hot Melts", which descriptions are incorporated herein by reference.

The proportions of the components to be included in the compositions will vary somewhat, depending upon the end use application of the composition. If, for example, no bonding to metal foil is contemplated, proportions may be chosen so as to emphasize maximum strength of bonding coextruded polymer films. However, the outstanding characteristics of the preferred compositions is their ability to form strong bonds with a variety of substrates, as for instance, polyesters, high density polyethylene and aluminum foil. Compositional ranges of interest are set forth in the following:

| Component | Broadest Range, Wt. % | Preferred Range, Wt. % | Most Preferred Range, Wt. % |
|---|---|---|---|
| Ethylene Copolymer | 10-90 | 25-70 | 35-55 |
| Chlorinated Polyethylene | 10-50 | 20-40 | 25-35 |
| Tackifying Resin | 4-40 | 10-35 | 20-30 |

The compositions are useful for the preparation of three-layer laminated sheet construction by coextrusion of the compositions between two polymer layers consisting, for example, of an ethylene homopolymer, an ethylene-vinyl alcohol copolymer, a propylene polymer or polyethylene terephthalate polyester, by coextrusion of a polymer layer and a layer of the composition onto the surface of a third independently fabricated layer consisting of paper, aluminum or copper sheet. Structures consisting of polymer layers, bonded to paper, aluminum foil and copper foil, are particularly useful in the packaging and electronic arts.

The compositions of this invention are also useful as hot melt adhesives to form a bonding layer between two independently fabricated sheets of polymers, paper or metal foils, as set forth above.

The preparation and properties of the compositions as set forth above, as well as experiments to demonstrate the effects of varying proportions of individual components, are set forth in the following illustrative examples:

EXAMPLES 1-18

Compositions were prepared by fluxing the components for twenty minutes in a Brabender Plasticorder operated at approximately 130° C. and 40 rpm. The blends subsequently were ground to a particle size that passed through an 8 mesh screen.

The adhesion of the blends to polyethylene terephthalate film (sold under trade name "Mylar") was measured. The powdered blend was distributed evenly over a section of one sheet of the polyester film (5 mil thick) and a second sheet of polyester film was laid on the assembly. The assembly then was pressed for ten minutes at 300° F. under an applied pressure of 2500 lbs/in$^2$. Specimens 1 in. wide were cut through both the bonded and the unbonded (adhesive free area) sections of the laminate. The peel strength of the laminated section was measured by pulling the laminate apart in an Instron machine operated at a cross head speed of 2 in./minute. In some, but not all cases, adhesion of the blends to film prepared from high density polyethylene (HDPE) and to aluminum foil was determined by the same method.

The compositions tested and their adhesion values—reported as T-Peel Strength in lb./inch—are set forth in Table I.

The ethylene copolymer employed is designated in the table as PE-2205, which was a commercially available ethylene-methyl acrylate copolymer, which contained 20 weight % of methyl acrylate and had a melt index of about 2.4. The chlorinated polyethylene is designated CPE, with the weight percentage chlorine indicated. The tackifying resins are designated by trade names. Foral AX is reported by the manufacturer to be a highly hydrogenated rosin having a softening point of about 75° C. Foral 85 is reported by the manufacturer to be a glycerine ester of highly hydrogenated rosin acids and has a softening point of about 80° C. Piccolyte S-70 is reported by the manufacturer to be a terpene polymer prepared from beta-pinene, having a softening point of about 70° C. Escorez 5300 is reported by the manufacturer to be an aliphatic hydrocarbon resin having a softening point of about 105° C. Adtac B-10 is reported by the manufacturer to be an aliphatic hydrocarbon resin having a softening point of about 10° C. Zonatac 105 is reported by the manufacturer to be a terpene resin having a softening point of about 105° C. Sta-tac 100 is reported by the manufacturer to be an aliphatic hydrocarbon resin having a softening point of about 100° C. Piccofyn A-115 is reported by the manufacturer to be a terpene-phenolic resin having a softening point of about 115° C. Piccotex 75 is reported by the manufacturer to be an alpha-methylstyrene/vinyl toluene copolymer having a softening temperature of about 75° C. Isoterp 95 is reported by the manufacturer to be a terpene-urethane resin having a softening temperature of about 95° C. Piccolastic A-75 is reported by the manufacturer to be a polystyrene resin having a softening point of about 75° C.

A stabilizer package was included in all compositions containing CPE. The package was added in an amount to provide, for each 100 parts of CPE, 2 parts of calcium stearate, 0.5 part stearic acid and 3 parts of epoxidized soya oil.

TABLE I

| Example | Composition | Substrate | T-Peel Strength lb/inch* |
|---|---|---|---|
| Control-1 | PE-2205 | Mylar | <1.0 |
| | | HDPE | <1.0 |
| | | Al-Foil | <1.0 |
| Control-2 | CPE(25% Cl) | Mylar | 14.5 |
| | | Al-Foil | 2.9 |
| Control-3 | CPE(36% Cl) | Mylar | 13.6 |
| 1 | 70% PE-2205 | Mylar | 2.5 |
| | 30% CPE(25% Cl) | HDPE | 1.8 |
| | | Al-Foil | 3.0 |
| 2 | 80% PE-2205 | Mylar | 1.9 |
| | 20% CPE(25% Cl) | | |
| 3 | 90% PE-2205 | Mylar | 1.7 |
| | 10% CPE(25% Cl) | | |
| 4 | 70% PE-2205 | Mylar | 3.6 |
| | 30% CPE(35% Cl) | HDPE | 3.5 |
| 5 | 45% PE-2205 | Mylar | 7.5 |
| | 30% CPE(25% Cl) | HDPE | 3.9 |
| | 25% Foral 85 | Al-Foil | 2.7 |
| 6 | 55% PE-2205 | Mylar | 1.1 |
| | 30% CPE(25% Cl) | HDPE | 3.6 |
| | 15% Foral 85 | Al-Foil | 1.7 |
| 7 | 45% PE-2205 | Mylar | 8.9 |
| | 30% CPE(25% Cl) | HDPE | 8.1 |
| | 25% Foral AX | Al-Foil | 3.0 |
| 8 | 60% PE-2205 | Mylar | 6.8 |
| | 20% CPE(25% Cl) | HDPE | 6.0 |
| | 20% Foral AX | Al-Foil | 1.5 |
| 9 | 70% PE-2205 | Mylar | 4.4 |
| | 20% CPE(25% Cl) | HDPE | 6.0 |
| | 10% Foral AX | Al-Foil | 0.3 |
| 10 | 45% PE-2205 | Mylar | 8.8 |
| | 30% CPE(25% Cl) | HDPE | 9.0 |
| | 25% Piccolyte S-70 | Al-Foil | 3.3 |
| 11 | 45% PE-2205 | Mylar | 7.3 |
| | 30% CPE(25% Cl) | HDPE | 9.6 |
| | 25% Zonatac 105 | Al-Foil | 1.7 |
| 12 | 45% PE-2205 | Mylar | 3.5 |
| | 30% CPE(25% Cl) | HDPE | 5.8 |
| | 25% Statac 100 | Al-Foil | 1.0 |
| 13 | 45% PE-2205 | Mylar | 7.7 |
| | 30% CPE(25% Cl) | HDPE | 7.2 |
| | 25% Escorez 5300 | | |
| 14 | 45% PE-2205 | Mylar | 2.7 |
| | 30% CPE(25% Cl) | HDPE | 4.3 |
| | 25% Adtac B-10 | | |
| 15 | 45% PE-2205 | Mylar | 7.0 |

TABLE I-continued

| Example | Composition | Substrate | T-Peel Strength lb/inch* |
|---|---|---|---|
| | 30% CPE(25% Cl) | HDPE | 5.3 |
| | 25% Piccofyn A-115 | Al-Foil | 2.1 |
| 16 | 45% PE-2205 | Mylar | 5.8 |
| | 30% CPE(25% Cl) | HDPE | 6.5 |
| | 25% Piccotex 75 | | |
| 17 | 45% PE-2205 | Mylar | 3.4 |
| | 30% CPE(25% Cl) | HDPE | 7.8 |
| | 25% Isoterp 95 | | |
| 18 | 45% PE-2205 | Mylar | 2.5 |
| | 30% CPE(25% Cl) | HDPE | 2.6 |
| | 25% Piccolastic A-75 | | |

*Average of 5 or more measurements

From the data shown for Control 1, it is noted that the ethylene copolymer exhibits little adhesion for the three (3) substrates tested. From the data shown for Controls 2 and 3, it is seen that chlorinated polyethylene shows good adhesion to Mylar and aluminum foil. It is deficient, however, in adhesion to nonpolar surfaces. In addition, it sometimes is deficient in stability.

Examples 1, 2, 3 and 4 show that binary blends of the ethylene copolymer and the chlorinated polyethylene give satisfactory adhesion to each of the three surfaces tested. The examples 5–18 show that three component systems containing a tackifying resin have better overall performance characteristics. Examples 5 and 6 show the effect of varying composition on adhesion in a system containing a glyceryl ester of rosin (Foral 85). Examples 7, 8 and 9 show the effect of varying composition on adhesion in a system containing a hydrogenated rosin (Foral AX). The remaining examples show the effect that varying the chemical type of tackifying resin has on adhesion, with all systems being tested in a fixed ratio of ethylene copolymer, chlorinated polyethylene and tackifying resin. By proper formulation, products can be prepared having optimized adhesion to a wide variety of substrates.

What is claimed is:

1. A blend of thermoplastic polymers consisting essentially of:
   (a) An ethylene copolymer,
   (b) A chlorinated polyethylene resin, and
   (c) Optionally a tackifying resin;
said ethylene copolymer having polymerized therein about 70 to 90 weight % of ethylene and the balance an alkyl ester of acrylic or methacrylic acid or vinyl acetate; said chlorinated polyethylene resin having an average chlorine content of 20 to 50 weight percent; said tackifying resin being selected from the group consisting of:
   (a) Terpene resins having a Ring and Ball softening point of about 10°–150° C.,
   (b) Aliphatic hydrocarbon resins having a Ring and Ball softening point of about 10°–135° C.,
   (c) Rosin esters having a Ring and Ball softening point of about 65°–140° C.,
   (d) Alpha-methylstyrene/vinyl toluene copolymers having a Ring and Ball softening point of about 75°–120° C.,
   (e) Polystyrene resins having a Ring and Ball softening point of about 25°–100° C.,
   (f) Terpene-phenolic resins having a Ring and Ball softening point of about 80°–135° C.,
   (g) Rosin,
   (h) Aromatic hydrocarbon resins having a Ring and Ball softening point of about 40°–160° C., and (j) Terpene-urethane resins having a Ring and Ball softening point of about 80°–135° C.;
said composition containing about 10–90 weight % of the ethylene copolymer, about 10–50 weight % of the chlorinated polyethylene, and about 0–40 weight % of the tackifying resin.

2. A composition of claim 1, which contains about 25–70 weight % of the ethylene copolymer, about 20–40 weight % of the chlorinated polyethylene, and about 10–35 weight % of the tackifying resin.

3. A composition of claim 1, which contains about 35–55 weight % of the ethylene copolymer, about 25–35 weight % of the chlorinated polyethylene and about 20–30 weight % of the tackifying resin.

4. A composition of claim 1, in which the ethylene copolymer is an ethylene-alkyl acrylate copolymer.

5. A composition of claim 2, in which the ethylene copolymer is an ethylene-alkyl acrylate copolymer.

6. A composition of claim 3, in which the ethylene copolymer is an ethylene-alkyl acrylate copolymer.

7. A composition of claims 2, 3, 5 or 6, in which the tackifying resin is a terpene resin having a Ring and Ball softening point of about 10°–150° C.

8. A composition of claims 2, 3, 5 or 6, in which the tackifying resin is an aliphatic hydrocarbon resin having a Ring and Ball softening point of about 10°–135° C.

9. A composition of claims 2, 3, 5 or 6, in which the tackifying resin is a rosin ester having a Ring and Ball softening point of about 65°–140° C.

10. A composition of claims 2, 3, 5 or 6, in which the tackifying resin is an alpha-methylstyrene/vinyl toluene copolymer having a Ring and Ball softening point of about 75°–120° C.

11. A composition of claims 2, 3, 5 or 6, in which the tackifying resin is a polystyrene resin having a Ring and Ball softening point of about 25°–100° C.

12. A composition of claims 2, 3, 5 or 6, in which the tackifying resin is a terpene-phenolic resin having a Ring and Ball softening point of about 80°–135° C.

13. A composition of claims 2, 3, 5 or 6, in which the tackifying resin is rosin.

14. A composition of claims 2, 3, 5 or 6 in which the tackifying resin is an aromatic hydrocarbon resin having a Ring and ball softening point of about 40°–160° C.

15. A composition of claims 2, 3, 5 or 6, in which the tackifying resin is a terpene-urethane resin having a Ring and Ball softening point of about 80°–135° C.

16. A laminated sheet construction containing first and third laminae intimately fusion-bonded to a second lamina; each of said first and third laminae sheets being independently fabricated from paper, aluminum, copper, an ethylene polymer, or a polyethylene terephthalate polyester; and said second lamina being fabricated from a polymer composition of claim 1.

17. In an adhesive method for bonding together two articles having surfaces of paper, aluminum, copper, an ethylene homopolymer, or a polyethylene terephthalate polyester in which a hot melt adhesive heated above its melting point is placed between the surfaces to be bonded together and the assembly is cooled to ambient temperature to solidify such adhesive; the improvement which consists essentially of employing as the hot melt adhesive a polymer composition of claim 1.

18. In a coextrusion process for preparing a composite polymer film construction having polymers in the two surface layers which are fusion-bonded to each other by an intermediate polymer layer in which three polymer streams are fed into three channels of a film die, and the three polymer streams flow into the film die and are extruded to form an extrudate in which the three polymer streams form a film having three fusion-bonded layers, the improvement which consists of employing an ethylene homopolymer, or a polyethylene terepthalate polyester as the polymer to form each of the two surface layers and employing a polymer composition of claim 1 to form the intermediate polymer layer.

* * * * *